United States Patent [19]
Vaios et al.

[11] Patent Number: 5,463,681
[45] Date of Patent: Oct. 31, 1995

[54] SECURITY SYSTEM FOR TERMINATING FRAUDULENT TELEPHONE CALLS

[75] Inventors: Christos I. Vaios, Schrewsbury; Alan E. Malinowski, Union, both of N.J.; Dimitri N. Diliani, Aurora, Ill.

[73] Assignee: AT&T Corp., Murray Hill, N.J.

[21] Appl. No.: 174,927

[22] Filed: Dec. 29, 1993

[51] Int. Cl.⁶ .................................................. H04M 1/66
[52] U.S. Cl. ........................... 379/189; 379/218; 379/34; 379/145; 379/95
[58] Field of Search ..................................... 379/189, 200, 379/145, 95, 88, 89, 91, 201, 34, 218, 35

[56] References Cited

U.S. PATENT DOCUMENTS

| | | | |
|---|---|---|---|
| 4,893,330 | 1/1990 | Franco | 379/91 |
| 4,931,933 | 6/1990 | Chen et al. | 364/409 |
| 5,068,891 | 11/1991 | Marshall | 379/91 |
| 5,181,238 | 1/1993 | Medamana et al. | 379/91 |
| 5,274,698 | 12/1993 | Jang | 379/200 |
| 5,276,444 | 1/1994 | McNair | 379/91 |
| 5,317,627 | 5/1994 | Richardson, Jr. et al. | 379/88 |
| 5,323,448 | 6/1994 | Biggs | 379/91 |

*Primary Examiner*—Jeffery A. Hofsass
*Assistant Examiner*—Scott Wolinsky

[57] ABSTRACT

A fraud detection apparatus receives a telephone call including area and national numbers from a switch and determines when the telephone call is fraudulent. The fraud detection apparatus includes a switching processor capable of receiving the area code and national numbers from a local telephone switch. The switching processor may also have the capability of storing potential fraudulent call information, such as area codes, billing numbers and domestic or international directory numbers. The processor determines the telephone call to be fraudulent when any or a combination of the above numbers matches one of the potential fraudulent numbers stored in its memory.

3 Claims, 11 Drawing Sheets

FIG. 3

| PSUEDO COUNTRY CODE | COUNTRY CODE | FRAUD |
|---|---|---|
| 057 | 57 | 1 |
| . | . | . |
| . | . | . |
| . | . | . |

FIG. 4

| FRAUDULENT CALL TYPE INDICATOR | DESTINATION NUMBER |
|---|---|
| NANP | CARIBBEAN<br>809-NXX-XXXX |
| NANP | CANADIAN<br>NPA-NXX-XXXX |
| INTERNATIONAL | CC+NN |

CC+NN: COUNTRY CODE + NATIONAL NUMBER
NANP: NORTH AMERICAN NUMBERING PLAN
NPA: CANADIAN AREA CODES

| DESTINATION NUMBER | NUMBERING PLAN | ADJUNCT LOGICAL ADDRESS | FRAUD |
|---|---|---|---|
| CONTRY CODE + NATIONAL NUMBER | INTERNATIONAL | 1 | 0 |
| CONTRY CODE + NATIONAL NUMBER | NORTH AMERICAN NUMBERING PLAN | 5 | 1 |
| ⋮ | ⋮ | ⋮ | ⋮ |

FIG. 8

| CUSTOMER ID | TYPE OF ACCESS | TYPE OF SERVICE | NUMBERING PLAN | ADJUNCT LOGICAL ADDRESS | FRAUD FIELD |
|---|---|---|---|---|---|
| NXX-XXX | SWITCHED | INTERNATIONAL LONG DISTANCE SERVICE | NORTH AMERICAN NUMBERING PLAN | 0-15 | 0 |
| NXX-XXX | SWITCHED | INTERNATIONAL LONG DISTANCE SERVICE | INTERNATIONAL | | 1 |
| ⋮ | ⋮ | ⋮ | ⋮ | ⋮ | ⋮ |

SECURITY SYSTEM FOR TERMINATING FRAUDULENT TELEPHONE CALLS

BACKGROUND OF THE INVENTION

1. Field of the Invention

The present invention relates generally to the field of preventing fraudulent telephone calls in a telecommunications network, and more particularly but not limited to, the detection and termination of fraudulent long-distance domestic or international telephone calls which may be originated either domestically or internationally.

2. Description of the Related Art

A significant number of domestic and international telephone users fraudulently initiate and establish domestic and international telephone calls to or from domestic or international locations. These fraudulent calls may be connected by using fraudulent credit card billing numbers, accessing private networks or using other methods.

Typically, the fraudulent telephone caller attempts to fraudulently obtain telephone service by transmitting a fraudulent billing number to the telephone network. The fraudulent caller may either steal the billing number from another party or gain entry to a private network by using various methods, e.g. billboards. This second method is especially popular since it cannot be detected by the private network administration until an excessive number of call minutes are completed. One technique currently being used to reduce fraudulent calls, domestically, involves a validation process to ascertain whether the submitted directory number in fact corresponds to an active billing number. Thus, this type of billing number validation process does not distinguish stolen calling card/billing numbers, or calls made through private networks. In this instance, the telephone network provides telephone service and bills the call to an improper billing number and the wrong customer/subscriber.

Accordingly, the telephone company providing the domestic or international telephone service would preferably desire a network feature which can block suspicious fraudulent domestic or international telephone calls, thereby preventing completion of the telephone call. Thus, it is desirable to determine whether an attempted telephone call is potentially fraudulent in order for the telephone network system to make an informed decision on whether or not to provide service to the telephone caller's request. This decision of whether to provide telephone service to a potential fraudulent telephone call may include validation of both originating and terminating parties, i.e, calling and called parties. It would also be desirable to minimize the amount of improper terminations of telephone calls which may in fact be non-fraudulent. Finally, it is also desirable to minimize the amount of performance degradation experienced by the various affected telephone switching centers which perform the fraudulent call determination process.

SUMMARY OF THE INVENTION

It is therefore an object of the present invention to efficiently determine when a telephone call is potentially fraudulent, and to terminate the potential fraudulent telephone call based upon predetermined criteria.

It is another object of the present invention to determine when a telephone call is fraudulent whether the telephone call is requesting incoming or outgoing long distance telephone service.

It is another object of the present invention to minimize the amount of performance degradation experienced by the affected switching centers by strategically placing the required information for determining whether a telephone call is fraudulent only in switching centers which require such information, e.g., at the entry points of the telephone network (access).

It is also an object of the present invention to provide a knowledge-based system for intelligently determining whether a telephone call is fraudulent.

To achieve these and other objects, the present invention provides a fraud detection system and method for receiving a telephone call including area and national numbers from a switch and determining when the telephone call is fraudulent. The fraud detection system includes a processor connected to the switch and receiving the area and national numbers from the switch, and a memory connected to the processor and storing potential fraudulent area numbers and fraudulent area and national numbers. The processor determines the telephone call to be fraudulent when the area number matches one of the potential fraudulent area numbers, and when the area and national numbers match one of the fraudulent area and national numbers.

In addition, the present invention provides in another embodiment a fraud detection system for receiving a telephone call and determining when the telephone call is fraudulent, the telephone call including a destination number, a customer identifying number and a billing number. The fraud detection mechanism includes a switch including a first memory storing potential fraudulent customer identifying numbers, and a first processor connected to the first memory and determining the telephone call to be potentially fraudulent when the customer identifying number matches one of the potential fraudulent customer identifying numbers stored in the first memory. The first processor transfers the telephone call including the customer identifying/originating number, the billing number and the destination number for further fraud processing when the telephone call is determined to be potentially fraudulent (e.g., a country code with a history of fraudulent calls).

In addition, the fraud detection apparatus may include a knowledge base system connected to the switch and having a second memory storing fraudulent destination numbers, and a second processor connected to the second memory and receiving the telephone call transmitted from the first processor. The second processor determines the telephone call to be fraudulent when the destination number matches one of the fraudulent destination numbers stored in the second memory.

These, together with other objects and advantages which will be subsequently apparent, reside in the details of construction and operation as more fully hereinafter described and claimed, with reference being had to the accompanying drawings forming a part hereof, wherein like numerals refer to like elements throughout.

BRIEF DESCRIPTION OF THE DRAWINGS

FIG. 3 is a country code (CC) table identifying country codes which have been designated as receiving potential fraudulent international telephone calls;

FIG. 4 is a fraudulent destination number (FDN) table indicating destination numbers which have been determined to be fraudulent according to the present invention;

FIG. 8 is an automatic number identifier (ANI) table illustrating automatic number identifiers which have been designated as fraudulent;

DESCRIPTION OF THE PREFERRED EMBODIMENTS

Figure 1:
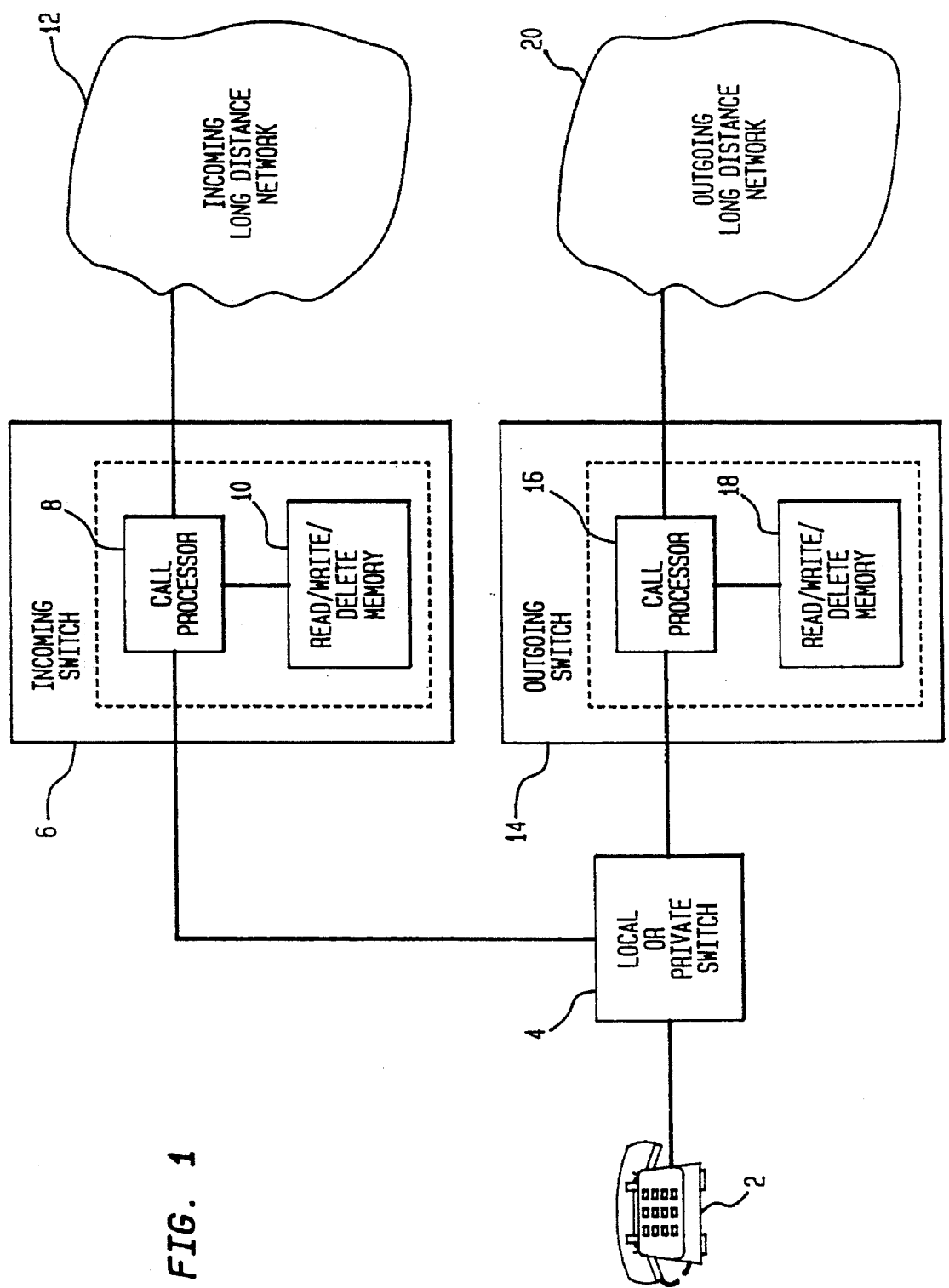
FIG. 1 is a block diagram illustrating the basic operation of a preferred embodiment of the present invention.

FIG. 1 is a block diagram of the structure illustrating the basic operation and the present invention. FIG. 1 illustrates the implementation of the present invention using separate incoming and outgoing switches. However, in common practice, the incoming and outgoing switching functions are implemented using a single switch. In FIG. 1 telephone 2 initiates and receives long distance telephone calls which are billed to the initiator of the telephone call based upon a predetermined rate charged on a time-of-use basis. Telephone 2 receives and originates telephone calls via local switch 4 (or private switch such as a PBX) in a conventional manner. Local switch 4 is connected to conventional incoming switch 6 and conventional outgoing switch 14 in order to receive incoming telephone calls as well as originate outgoing telephone calls respectively to areas where local switch 4 is unable to directly establish telephone service. Incoming switch 6 and outgoing switch 14 may be, for example, the 4ESS switch manufactured and sold by AT&T. Incoming switch 6 may then be connected to an incoming network 12 which has transmitted the telephone call to a domestic or foreign network, and outgoing switch 14 may be connected to an outgoing network 20 which is receiving the telephone call from a domestic or foreign network. For example, incoming network 12 may be designated as an incoming foreign network for handling international long distance services, and outgoing network 20 may also be designated as an outgoing foreign network for establishing outgoing international long distance service. Alternatively, incoming network 12 may be designated as a domestic incoming network for receiving incoming domestic long distance telephone service, and outgoing network 20 may also be designated as an outgoing domestic network for establishing outgoing long distance domestic telephone calls. Further, outgoing network 20 and incoming network 12 may be a combination of domestic and foreign networks or a combination of incoming and outgoing networks, as it would be in the case of global networks.

In order to properly process the telephone call and to determine whether or not the telephone call should be designated as fraudulent and terminated, incoming switch 6 is provided with a call processor 8 which is connected to a read/write/delete memory 10. Read/write/delete memory 10 may be internal to processor 8 as shown in FIG. 1 which permits fast access to the information, or may be external in the form of a database. Call processor 8 may be a conventional call processor, such as, for example, the 1A processor manufactured and sold by AT&T. Call processor 8 performs the necessary operations by comparing the received data from incoming network 12 with stored data in read/write/delete memory 10 for determining whether the incoming telephone call received from incoming network 12 is fraudulent and whether the incoming telephone call should be connected to telephone 2 via local switch 4. Similarly, outgoing switch 14 includes call processor 16 which receives data from local switch 4 to determine whether the telephone call initiated by telephone 2 is fraudulent and whether the telephone call should be connected to outgoing network 20.

Figure 2:
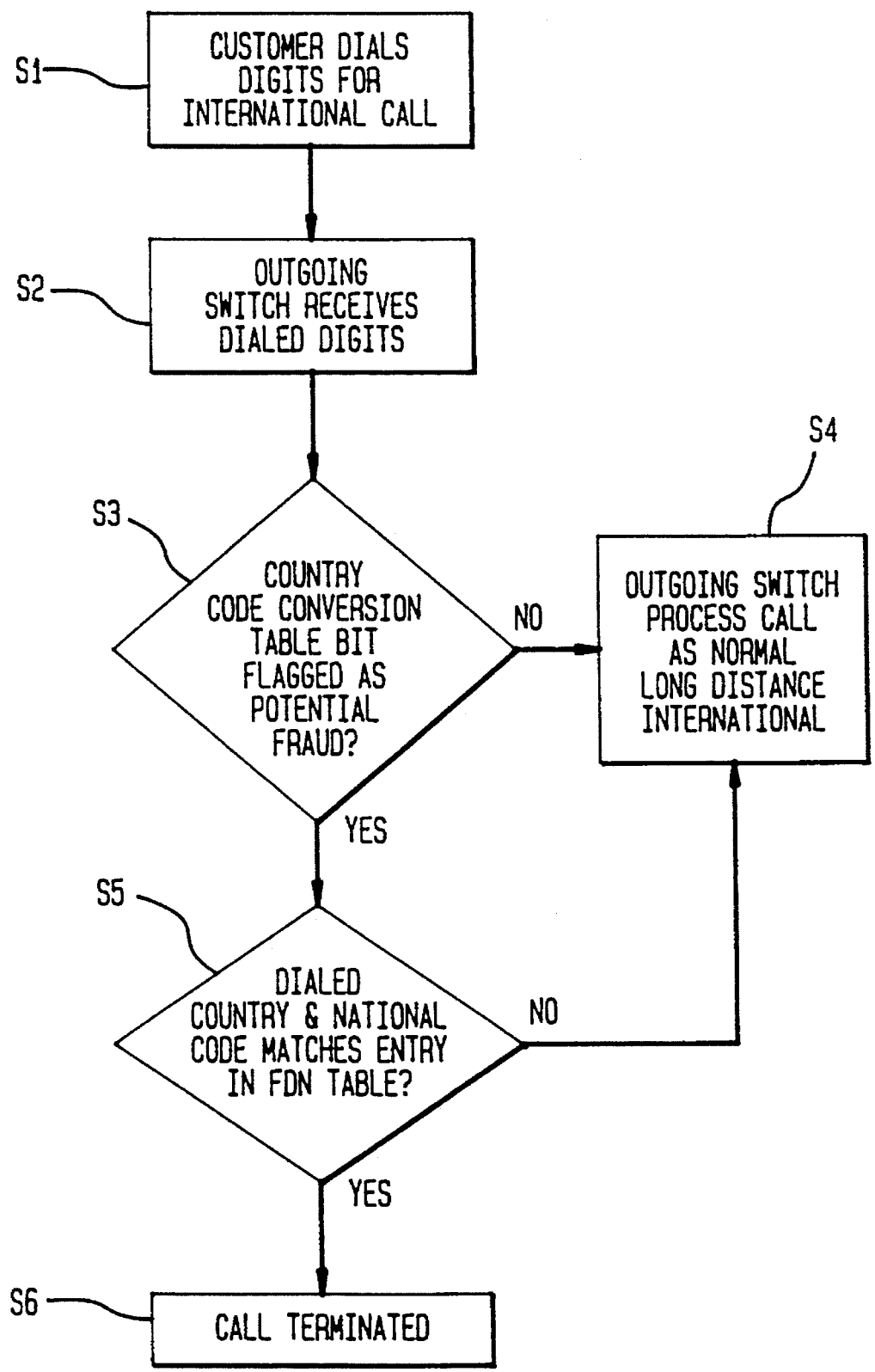
FIG. 2 is a flow chart illustrating the basic operation performed by the embodiment of FIG. 1 for outgoing long distance telephone calls.

FIG. 2 is a flow chart of the basic operation performed by call processor 16 and outgoing switch 14 according to the first embodiment of the present invention. FIG. 2 specifically details the process for an international long distance outgoing telephone call; however, the present invention is equally applicable to domestic long distance outgoing telephone calls as well.

In FIG. 2, telephone 2 initiates the international long distance telephone call by transmitting digits to local switch 4 which thereupon transmits the digits to call processor 16 in outgoing switch 14 (step S1). Call processor 16 in outgoing switch 14 receives the dialed digits from local switch 4 (step S2). The dialed digits include, for the present scenario, a country code (CC) designating a specific destination country and a national number designating the telephone number of the party where the telephone call is to be connected to in the foreign country. Alternatively, as indicated previously, instead of a country code, the present invention may also use a combination of an area code and a destination number (e.g., 7–10 digit directory number) for determining whether a domestic telephone call is fraudulent.

Outgoing switch 14 first determines whether it contains or stores the appropriate information in read/write/delete memory 18 to perform the fraudulent call processing based upon the existence of, for example, the fraudulent destination number (FDN) table which is discussed in detail below and which may be stored in read/write/delete memory 18 in the form of a logic table. When call processor 16 determines that read/write/delete memory 18 includes the appropriate information for making the fraudulent determination, call processor 16 performs the country code comparison (step S3). When, however, call processor 16 determines that it does not have access to the appropriate information for making the fraudulent determination, call processor 16 routes the telephone call to a predetermined next outgoing switch to perform the fraudulent call processing.

When call processor 16 determines it will perform the fraudulent determination, call processor 16 then determines whether the country code received in the dialed digits matches one of the stored country codes in the country code conversion table which is flagged as a country experiencing, for example, an abnormal amount of fraudulent telephone calls (step S3). The country code conversion table is stored in read/write/delete memory 18 and permits the switch provider to add, remove or change the country code data, and may be, for example, a table such as shown in FIG. 3, described more fully hereafter.

When call processor 16 determines that a match does not exist between the received country code and any of the country codes in the country code table which is flagged as a potential fraud, call processor 16 thereupon processes the outgoing telephone call as a normal long distance international telephone call (step S4). However, when call processor 16 determines that a match exists between the received country code and one of the country codes inventoried in the country code table (FIG. 3), call processor 16 then determines whether the dialed digits including the country code and national code match one of the country code and national code combinations in a fraudulent destination number (FDN) table stored in read/write/delete memory 18 (step S5), as shown in FIG. 4, and described more fully hereafter.

If the country and national codes of the dialed digits match one of the entries in the fraudulent destination number table, call processor 16 thereupon terminates the call (step S6). However, when the received country code and national code combination do not match any of the entries in the fraudulent destination number table, call processor 16 thereupon directs outgoing switch 14 to process the call as a normal international long distance telephone call in step S4.

As shown in FIG. 3, the country code is included in one column of the table and mapped against a potential fraud column also in the table. For those countries which are considered as potential fraud candidates, the respective country code includes a bit with, for example, the number 1 to indicate potential fraud. The other entries, i.e., columns, in the country code conversion table are used for conventional routing techniques to connect the international telephone call to the appropriate outgoing switch 14 for connection to the appropriate outgoing network 20. In addition, a pseudo country code is also mapped against the actual country code. The pseudo country code is typically the country code which is dialed by the telephone user which is then translated or converted into the country code which is used for processing the telephone call in outgoing switch 14.

Referring to FIG. 4, the fraudulent destination number table stores various destination numbers which have been previously determined to be fraudulent along with the fraudulent call type indicator which indicates the particular format of the international long distance telephone call. In addition, international long distance telephone calls conform to either the North American. Numbering Plan (NANP) Standard or the International Standard. Within the North American Numbering Plan Standard, there are typically two types of formats; the first format for international long distance telephone calls to the Caribbean and the second format for international long distance telephone calls to Canada.

Figures 5, 6:
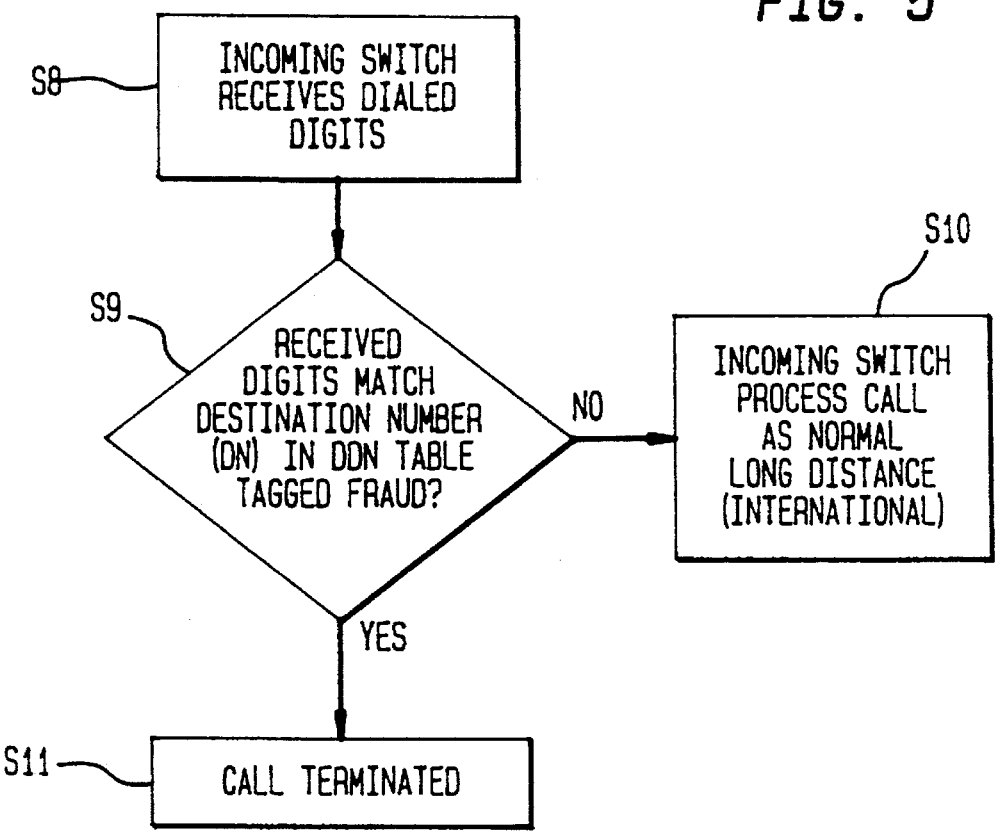
FIG. 5 is a flow chart illustrating the operation of the present invention for incoming long distance telephone calls.
FIG. 6 is a destination directory number (DDN) table illustrating destination numbers which are fraudulent for incoming long distance telephone calls.

FIG. 5 is a flow chart of the operation of call processor 8 in incoming switch 6 of the present invention for an incoming telephone call received from incoming network 12. As illustrated, incoming switch 6 receives the dialed digits from incoming network 12 (step S8). Call processor 8 then determines whether incoming switch 6 contains the appropriate information for performing the fraudulent determination process for an incoming telephone call by, for example, determining whether read/write/delete memory 10 stores the destination directory number (DDN) table, discussed in detail below with respect to FIG. 6. If call processor 8 determines it cannot perform the fraudulent determination process, call processor 8 redirects the call to a predetermined next incoming switch to perform the determination. If, however, call processor 8 determines it can perform the determination, call processor 8 then determines whether the received digits match one of the destination numbers inventoried in the destination directory number (DDN) table having a fraudulent indication (step S9).

If call processor 8 determines that the received digits do not match any of the stored destination numbers in the destination directory number table which is fraudulent, call processor 8 then processes the incoming telephone call in incoming switch 6 as a normal long distance telephone call (step S10). However, if call processor 8 determines that the received digits match one of the destination numbers in the destination directory number table which is inventoried as fraudulent, call processor 8 thereupon terminates the call (step S11) thereby preventing a fraudulent telephone user from receiving all telephone calls. As previously indicated, these long distance telephone calls may be either domestically or internationally originated.

Referring to FIG. 6, there is illustrated a destination directory number table which stores a destination number including a country code and national code/number. In addition, the destination directory number table also includes a fraud field which designates whether the listed destination numbers are to be considered fraudulent. The destination directory number table is stored in read/write/delete memory 10.

Figure 7:
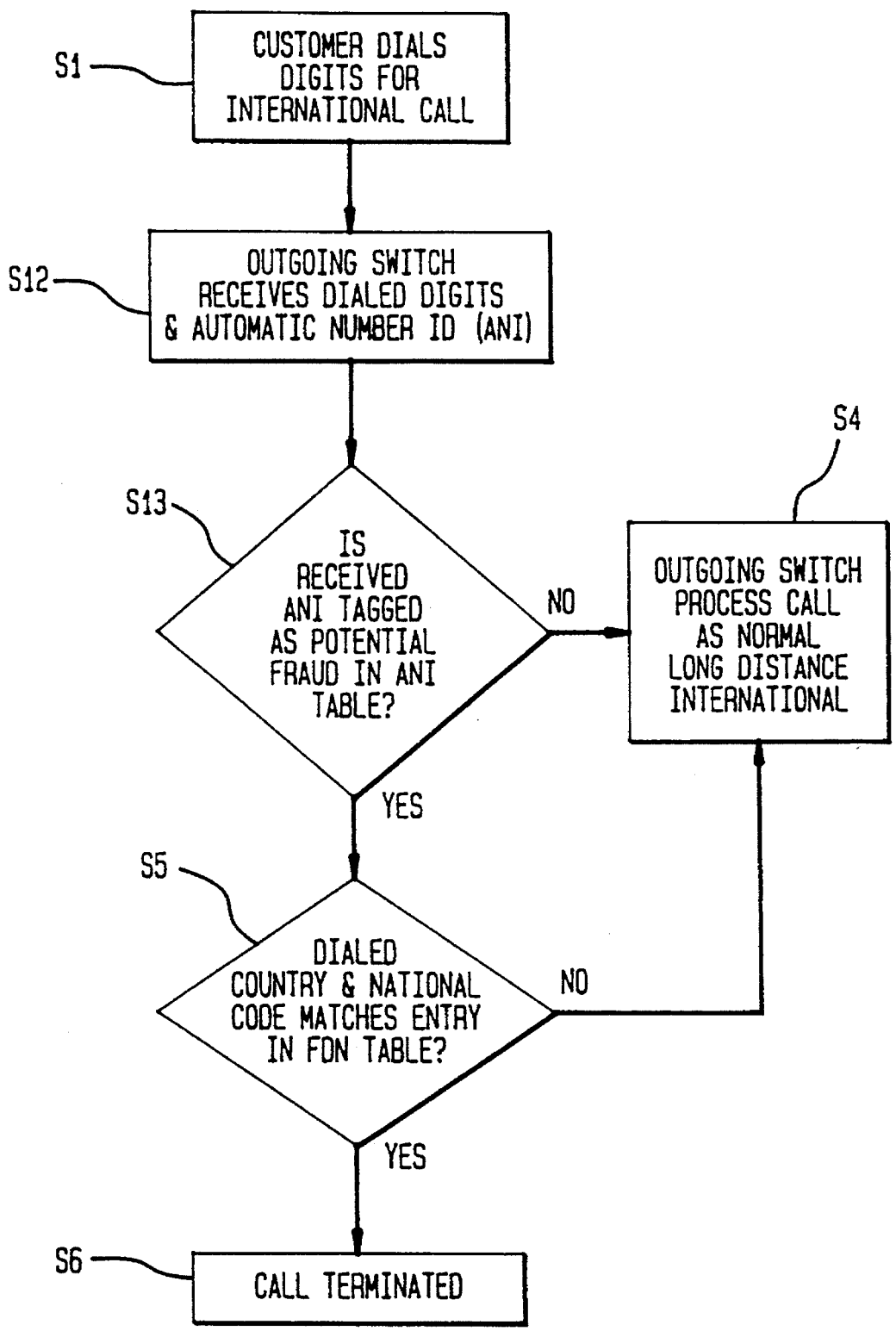
FIG. 7 is a flow chart illustrating the operation of an alternate embodiment of the present invention.

FIG. 7 is a flow chart of the operation of call processor 16 in outgoing switch 14 according to a modified embodiment of the present invention. The embodiment shown in FIG. 7 includes substantially the same function as call processor 16 described above with references to FIGS. 1–6. Therefore, similar steps will be designated by similar reference characteristics. The main differences concern steps S2 and S3 of FIG. 2 and steps S12 and S13 in FIG. 7.

As shown in FIG. 7, call processor 16 receives dialed digits and the automatic number identifier from telephone 2 via local switch 4 for connecting to outgoing network 20 (step S12) and determines whether it can perform the fraudulent determination as previously discussed with respect to step S2 of FIG. 2. Call processor 16 then determines whether the received automatic number identifier which indicates the received automatic number identifier initiating the outgoing telephone call matches one of the automatic number identifiers (ANI) stored in the automatic number identifier table in read/write/delete memory 10 (step S13). (The automatic number identifier (ANI) table, shown in FIG. 8, includes a customer automatic number identifier as well as a fraud field indicating whether the listed customer automatic number identifier is designated as fraudulent, along with various other data used for conventional telephone connection and routing services.)

When call processor 16 determines that a received automatic number identifier does not match any of the customer automatic number identifiers listed in the ANI table (step S13), call processor 16 then performs normal long distance international processing of the telephone call (step S4) as previously discussed. However, if call processor 16 determines that the received automatic number identifier does match one of the customer automatic number identifiers listed in the ANI table as fraudulent, call processor 16 performs the second stage comparison of the country and national codes stored in the fraudulent destination number table as in step S5 as described above. In addition, with respect to the processing of an incoming call in incoming switch 6 and call processor 8, call processor 8 performs the same operation for determining whether the incoming telephone call is fraudulent as discussed with reference to FIG. 5.

As can readily be seen from the description of the foregoing embodiments, both incoming switch 6 and outgoing switch 14 store the required information for performing the fraudulent call processing for incoming and outgoing calls. Accordingly, incoming and outgoing long-distance networks 12 and 20 are relieved of the task of performing these operations. This is a significant advantage since these networks are typically very busy and would be greatly impacted in terms of performance if they had to perform these added operations.

Alternatively, incoming and outgoing networks 12 and 20 may also perform the fraudulent processing. In that instance, incoming and outgoing switches 6 and 14 would perform no fraudulent processing but would route the call to the appropriate network 12 or 20 which connect with other networks for connecting the telephone call. For example, incoming network 12 will connect with another outgoing network which handles the call from the originator of the telephone call until it connects with incoming network 12.

Figure 9:
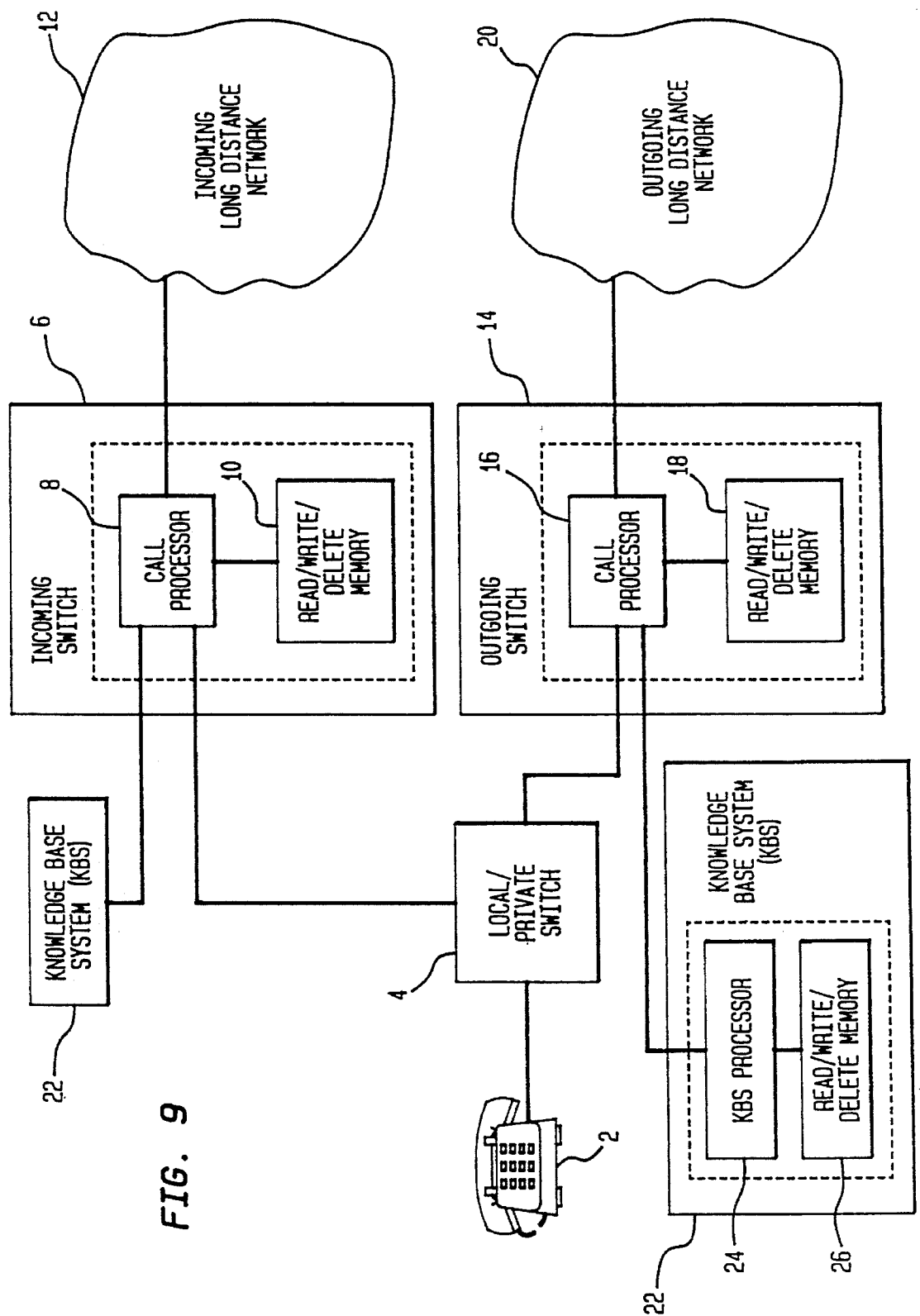
FIG. 9 is a block diagram illustrating the operation of a another embodiment of the present invention using a knowledge base system.

FIG. 9 is a block diagram illustrating another modified embodiment of the present invention. FIG. 9 illustrates the implementation of the present invention in a similar manner as discussed in FIG. 1. The embodiment of FIG. 9 includes knowledge base system (KBS) 22 having KBS processor 24 and conventional read/write/delete memory 26. KBS 22 may be, for example, the KBS system described in U.S. Pat. No. 4,931,933 to Chen et al., incorporated herein by reference. According to the embodiment of FIG. 9, incoming switch 6 and outgoing switch 14 only perform the preliminary determinations for a potentially fraudulent telephone call, and then route the potentially fraudulent telephone call to knowledge base system 22 to perform a more sophisticated fraudulent telephone call detection procedure which is implemented by KBS processor 24. Accordingly, part of the information required to determine whether a telephone call is fraudulent is stored in incoming and outgoing switches 6 and 14 and part of the information is stored in KBS 22.

Figure 10:
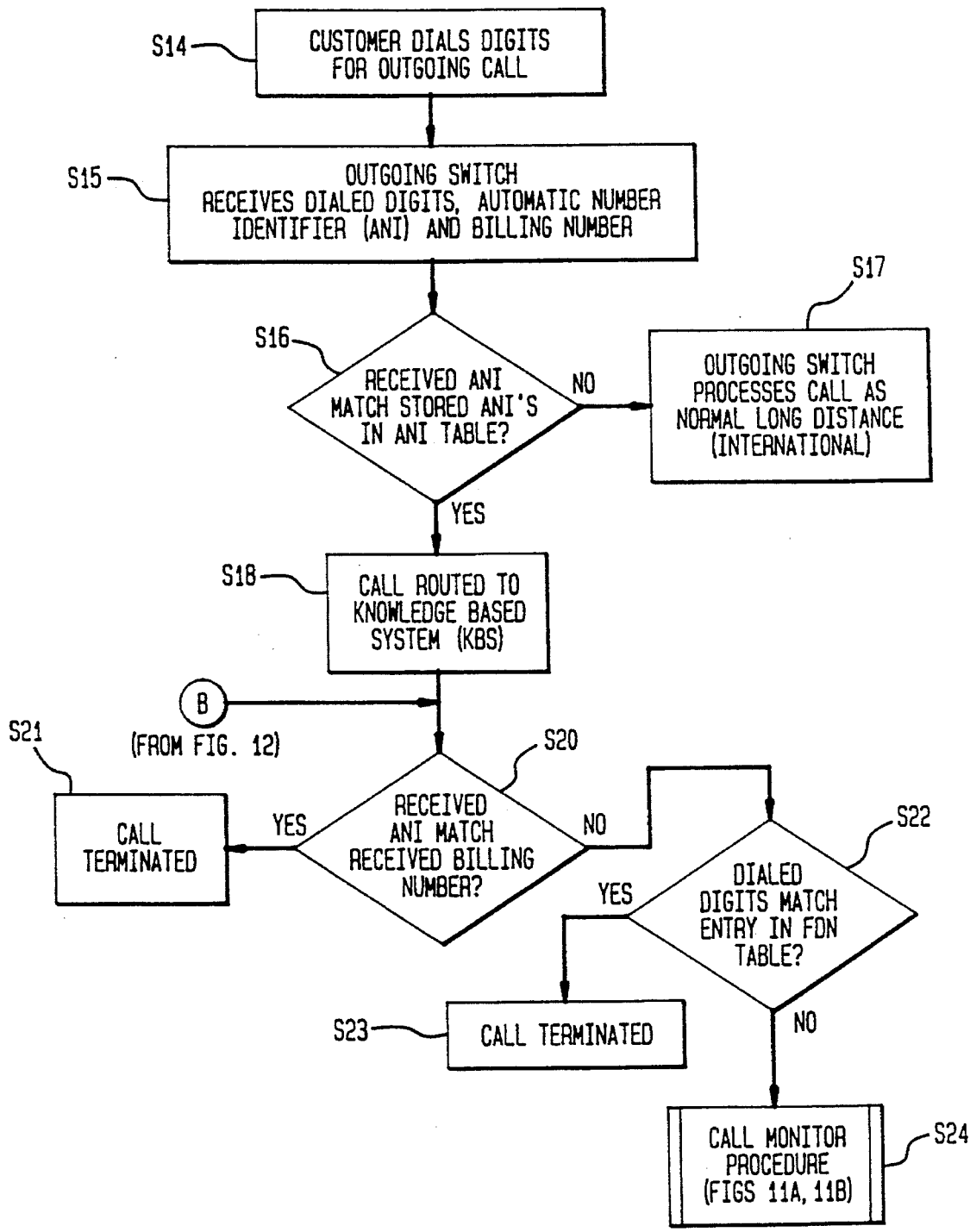
FIG. 10 is a flow chart illustrating the basic operation of the embodiment of FIG. 9 for outgoing long-distance telephone calls.

FIG. 10 is a flow chart of the basic operation of the fraudulent detection procedure according to the embodiment of FIG. 9. In FIG. 10, telephone 2 dials digits for an outgoing call (step S14) which is transmitted to outgoing switch 14 via local switch 4. Outgoing switch 14 receives the dialed digits, the automatic number identifier (AND and a billing number via call processor 16 (step S15). Call processor 16 then determines whether it is to perform an initial fraudulent determination by, for example, determining whether read/write/delete memory 18 stores an automatic number identifier (ANI) table, as previously discussed. If call processor 16 determines it cannot perform the fraudulent determination, call processor 16 then routes the call to another switch to perform such determination.

When call processor 16 determines it will perform the initial determination, call processor 16 consults with the automatic number identifier table stored in read/write/delete memory 18 to determine whether the received automatic number identifier matches one of the stored automatic number identifiers which have been indicated as fraudulent (step S16). If call processor 16 determines that the received ANI does not match any of the stored ANIs in the ANI table, call processor 16 processes the outgoing telephone call as a normal long distance telephone call, and the long distance telephone call is connected via outgoing long distance network 20 (step S17). However, if processor 16 determines that the received ANI matches one of the stored ANIs in the ANI table of read/write/delete memory 18, call processor 16 routes the potential fraudulent call to KBS system 22 (step S18) including the dialed digits, received ANI and billing number.

KBS processor 24 receives the call routed from call processor 16 and determines whether the received ANI matches the received billing number which has been transmitted from outgoing switch 14 to KBS system 22 (step S20). When the received ANI matches the received billing number, the potential fraudulent user is attempting to bill itself, and therefore, the call is terminated by KBS processor 24 (step S21). If KBS processor 24 determines in step S20 that the received ANI does not match the received billing number, KBS processor 24 then determines whether the dialed digits match one of the entries in the fraudulent destination number table which indicates that the dialed digits are to be considered as a fraudulent telephone call (step S22). In this entitlement the fraudulent destination number table may be stored in the read/write/delete memory 26 of the KBS system 22 rather than in incoming switch 6 or outgoing switch 14 as in the previous embodiments. When the dialed digits match one of the entries in the fraudulent destination number table, KBS processor 24 terminates the telephone call as a fraudulent telephone call (step 23). When, however, the dialed digits do not match any of the entries in the fraudulent destination table, KBS processor 24 implements the call monitor procedure (step S24) described below as the reference for FIGS. 11(a) and 11(b).

Figure 11A:
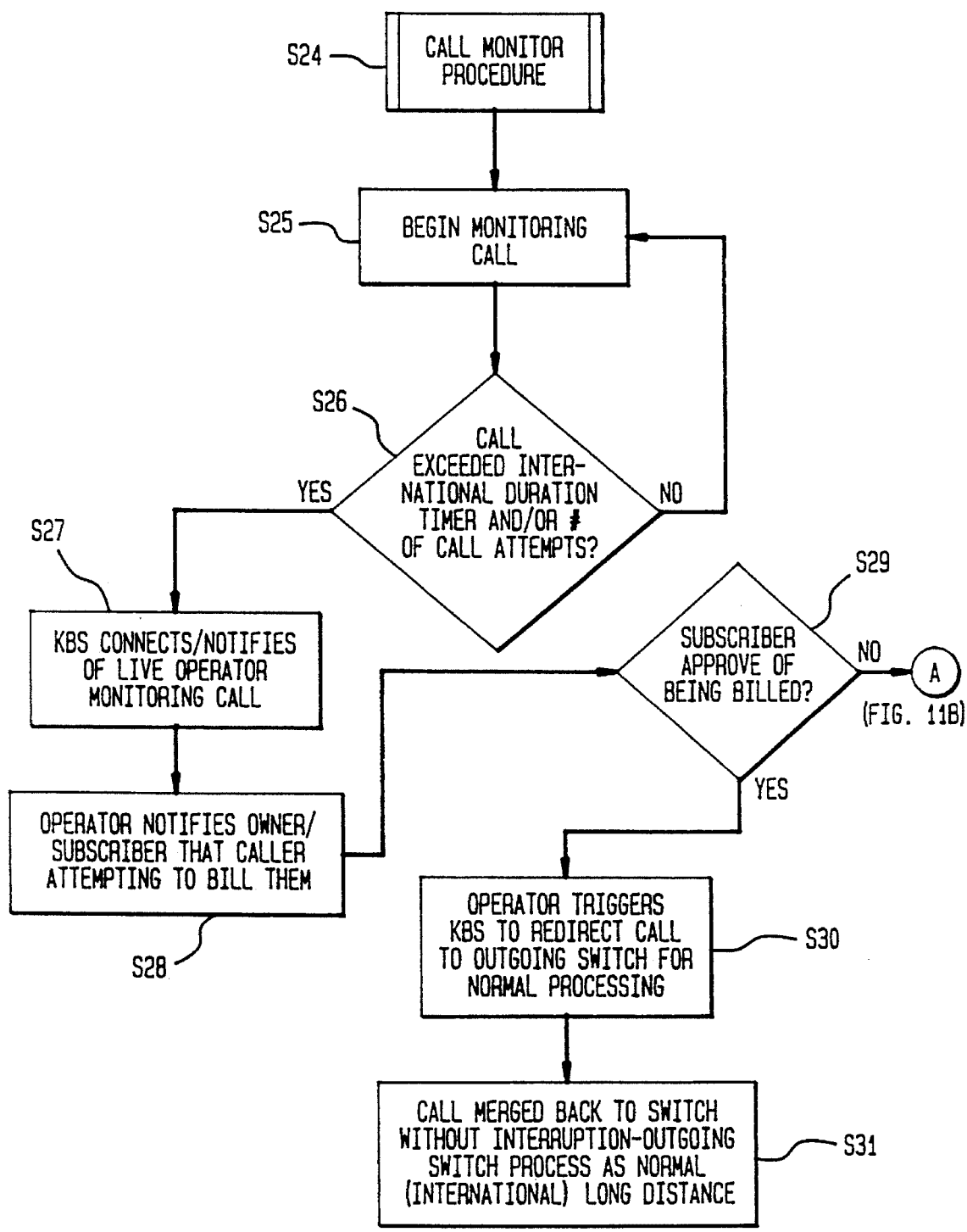
FIGS. 11(a) and 11(b) are flow charts illustrating the call monitor procedure according to the embodiment of FIG. 9.
Figure 11B:
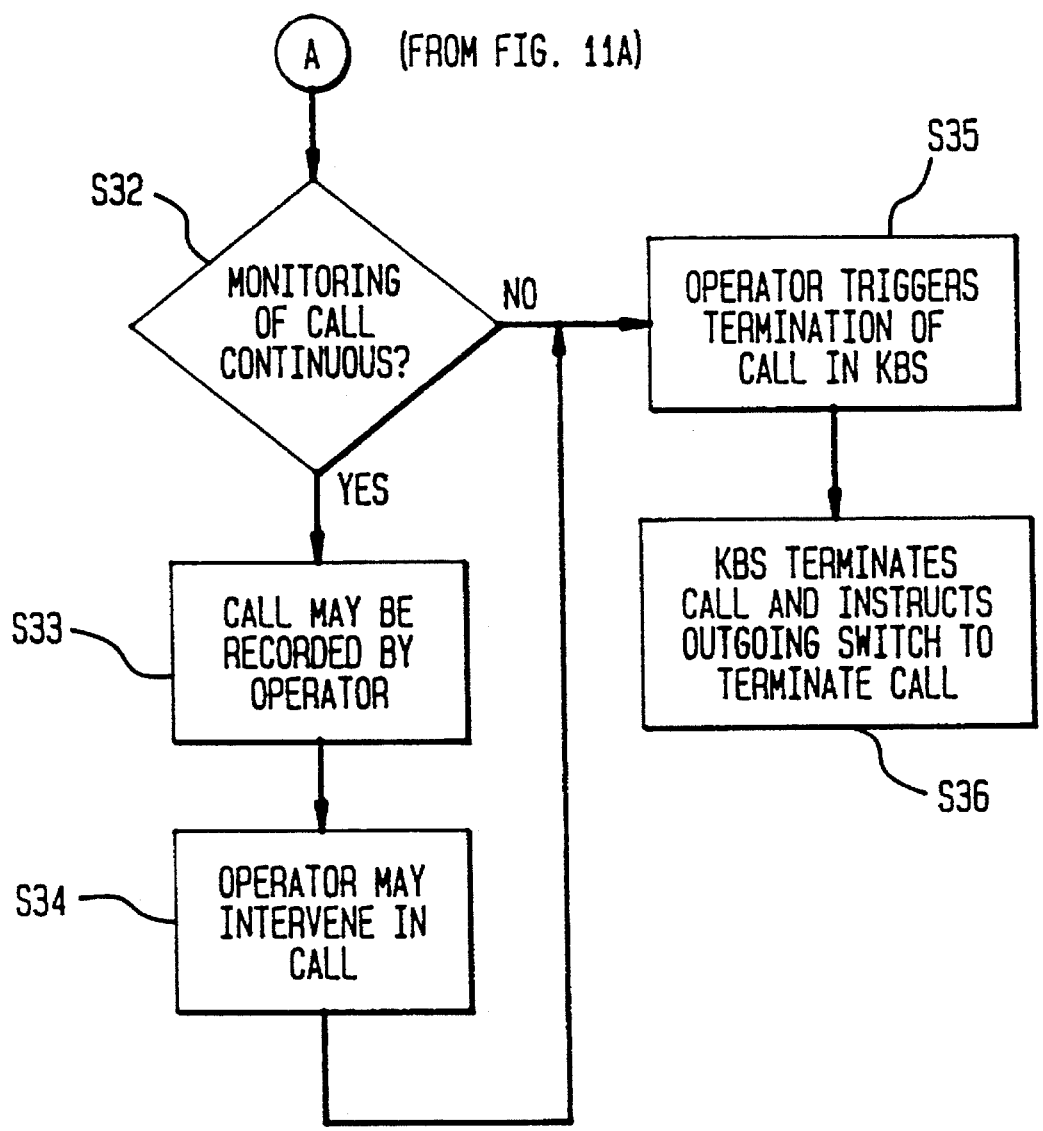

FIGS. 11(a) and 11(b) together illustrate the call monitor procedure of the embodiment of FIG. 9. As shown in these figures, when the call monitor procedure is implemented (step S24), the telephone call suspected of being fraudulent is monitored (step S25). Thus, in order to prevent non-fraudulent telephone calls from being erroneously terminated, KBS processor 24 determines when the telephone call has exceeded either a call duration timer, or a number of call attempts counter (step S26). If the call duration timer has not exceeded a predetermined call time and the number of call attempts counter has also not exceeded a predetermined number, the telephone call continues to be monitored (step S25). However, when either the call duration timer or the call attempt counter has exceeded their threshold level, KBS processor 24 connects a live operator to the telephone call and notifies the suspected fraudulent user of the presence of a live operator (step S27). Next, the operator notifies the owner/subscriber that the potential fraudulent telephone caller is attempting to bill that number (step S28) and attempts to obtain approval of use of the subscriber's billing number (step S29). If the subscriber has authorized use of their billing number, the operator triggers KBS system 22 to redirect the telephone call to outgoing switch 14 for normal long distance processing (step S30). In addition, outgoing switch 14 then processes the telephone call as a normal long distance telephone call (step S31).

If, however, the operator determines that the subscriber does not approve of being billed (step S29), the operator may continue to monitor the call (step S32) by, e.g., monitoring the call via a recorder (step S33) and/or by interrupting the call (step S34). The operator then triggers termination of the call in KBS system 22 (step S35) which then terminates the call and instructs the outgoing switch 14 to also terminate the call (step S36). If the operator determines that the call should not be monitored (step S32), the operator directly triggers termination of the call (step S35) and KBS system 22 terminates the call and instructs outgoing switch 14 to also terminate the call (step S36).

Figure 12:
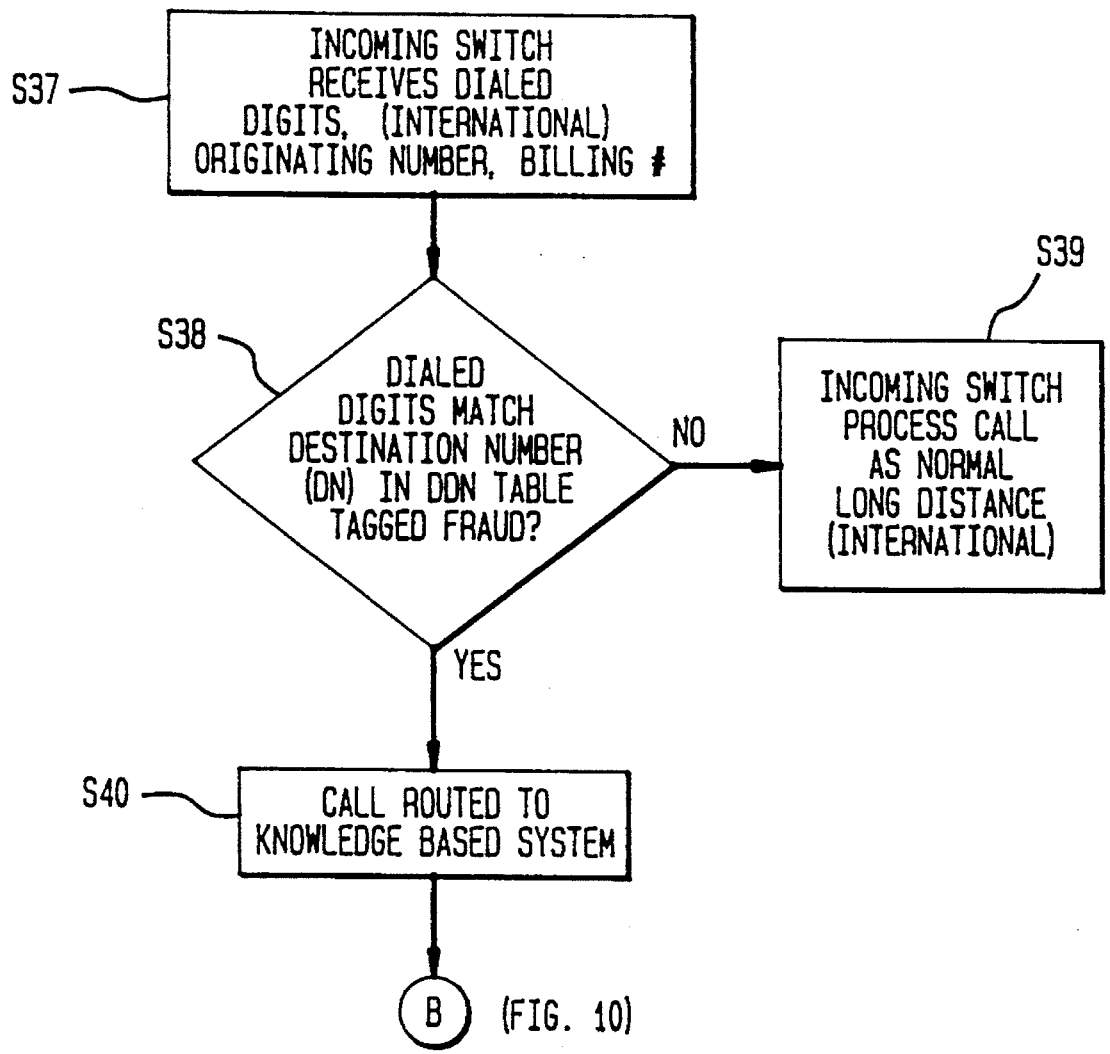
FIG. 12 is a flow chart illustrating the operation of the third embodiment of the present invention for incoming long-distance telephone calls.

FIG. 12 is a flow chart of the operation of the embodiment of FIG. 9 for an incoming telephone call. In FIG. 12, incoming switch 6 receives dialed digits, an originating number and a billing number (step S37). As discussed previously, call processor 8 determines whether it is to perform the fraudulent processing. When call processor 8 determines that it will perform the fraudulent processing, call processor 8 then determines whether the received digits match one of the destination numbers in the destination directory number (DDN) table which has been tagged as a fraudulent destination number (step S38). If the dialed digits do not match any of the destination numbers in the destination directory number table which have been tagged as fraudulent, call processor 8 initiates normal long distance telephone connection service (step S39) and incoming switch 6 processes the telephone call as a normal long-distance call. When the dialed digits match one of the destination numbers in the destination directory number table, call processor 8 routes the telephone call to KBS system 22 for determining whether the potential fraudulent telephone call is in fact fraudulent as determined by the knowledge base system (step S40). Upon receipt of the telephone call routed from call processor 8, KBS processor 24 and knowledge base system 22 process the call beginning with step S20 in FIG. 10. KBS processor 24 then processes the incoming telephone call as previously indicated with respect to the outgoing telephone call with reference to FIGS. 10, 11(a) and 11(b) except, of course, incoming switch 6, processor 8 and read/write/delete memory 10 respectively replace outgoing switch 14, processor 16 and read/write/delete memory 18.

As can readily be seen with respect to the embodiment of FIG. 9, incoming and outgoing switches 6 and 14 are minimally impacted. These switches only perform the initial fraudulent determination and route the call to KBS 22 when appropriate. Therefore, the latter embodiment permits the load or impact of the fraudulent processing to be diverted away from incoming and outgoing switches 6 and 14.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method of determining when a telephone call received by a switch is fraudulent, the telephone call including a destination number, a customer identifier number and a billing number, comprising the steps of:

(a) receiving the destination number, the billing number and the customer identifier number in a first processor of said switch;

(b) comparing the customer identifier number to potential fraudulent customer identifying numbers stored in a first memory of said switch;

(c) processing the telephone call, including the billing number, the customer identifier number and the destination number, by a second processor in a knowledge base system when the customer identifier number matches one of the fraudulent customer identifying numbers in said comparing step (b);

(d) comparing the destination number to fraudulent destination numbers stored in a second memory in the knowledge base system;

(e) terminating the telephone call when the second processor determines that the destination number matches one of the fraudulent destination numbers in said comparing step (d);

(f) when the destination number does not match one of the fraudulent destination numbers in said comparing step (d), monitoring the telephone call to determine whether the telephone call has exceeded one of a predetermined call duration time and a predetermined number of call attempts;

(g) connecting an operator to the telephone call when the telephone call has exceeded one of said predetermined call duration time and said predetermined number of call attempts in said monitoring step (f), said operator contacting a subscriber financially responsible for the billing number and determining whether the subscriber authorizes the use of the billing number; and (l) terminating the telephone call when the subscriber refuses to authorize the use of the billing number.

2. The method of determining when a telephone call received by a switch is fraudulent according to claim 1, further comprising the step of:

processing the telephone call as a standard telephone call when the customer identifier number does not match one of the fraudulent customer identifying numbers in said comparing step (b).

3. The method of determining when a telephone call received by a switch is fraudulent according to claim 1, further comprising the step of:

processing the telephone call as a standard telephone call when the subscriber authorizes use of the billing number.

* * * * *